(No Model.)
G. E. TAYLOR.
THERMOMETER SCALE.
No. 355,846. Patented Jan. 11, 1887.
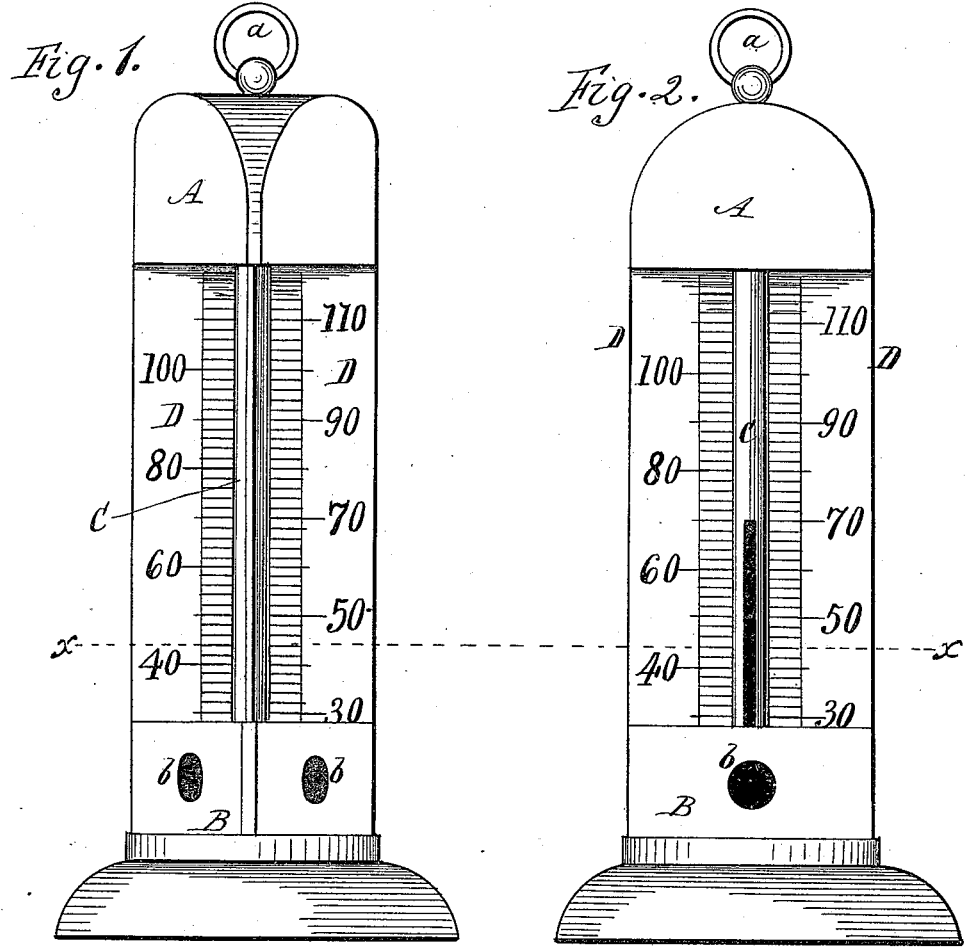
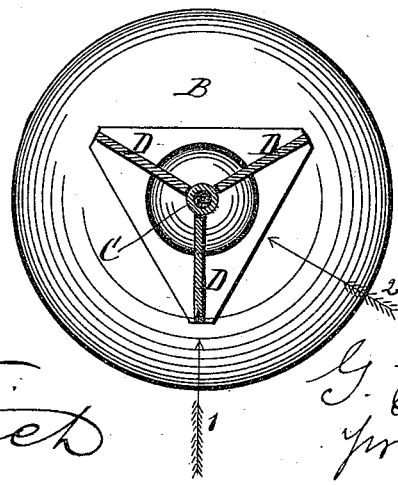

UNITED STATES PATENT OFFICE.

G. ELBERT TAYLOR, OF ROCHESTER, NEW YORK.

THERMOMETER-SCALE.

SPECIFICATION forming part of Letters Patent No. 355,846, dated January 11, 1887.

Application filed September 6, 1886. Serial No. 212,847. (No model.)

*To all whom it may concern:*

Be it known that I, GEORGE ELBERT TAYLOR, a citizen of the United States, residing at Rochester, in the county of Monroe and State of New York, have invented a certain new and useful Improvement in Thermometers; and I do hereby declare that the following is a full, clear, and exact description of the same, reference being had to the drawings accompanying this application.

The object of my invention is to provide a thermometer in which the scales and the thermometer-tube can be seen at any point of observation, and is especially adapted to be used in the center or open space of a room, either suspended from a chandelier or other support or placed on a table. Ordinary thermometers having a flat face can be seen only directly in front or within a certain radius, and therefore are not convenient for the purpose designated.

The invention consists, substantially, in the combination of a central thermometer-tube and a series of three or more scales set radially thereto, as hereinafter more fully described.

In the drawings, Figure 1 is an elevation of the thermometer, looking in the direction of arrow 1 in the cross-section, Fig. 3. Fig. 2 is a similar view looking in the direction of arrow 2. Fig. 3 is a horizontal cross-section in line $x$ $x$ of Figs. 1 and 2.

A and B indicate the cap and base of the thermometer, which may be made of any desired shape and of any suitable material. Preferably, however, they are made of thin metal either cast or pressed in shape. Where the device is to be suspended from a chandelier or other object, the cap is provided with a ring or other device, $a$, to suspend it by, and where it is to rest on a table or other support the base is properly shaped to make it stand.

C is the thermometer-tube, of usual form. For this purpose a spirit-tube is preferable, as the column can be seen at a greater distance.

It is set centrally in the supports, the base and cap having suitable holes to receive it, and secured in any desired manner inside the cap. Holes or passages $b$ $b$ are made in the base, leading to the interior, to allow the exterior air to come in contact with the bulb.

D D D are a series of three or more scales set radially to the central tube and close up to it. These scales are marked with the usual lines and figures, laying them off into degrees, and preferably the faces of the two scales on any one side are marked alternately, as shown, in order to use larger figures. If desired, however, they may be marked in the usual way on each side.

The advantage of this invention is that the scales and the tube can be seen from any direction, and therefore it is specially adapted to be used in the center of a room or in any open space where it is desired to use a thermometer. The mean temperature of a room is best ascertained from the center; but to use an ordinary thermometer the observer has to go around to the front to see the scale and tube. When made in ornamental form, it makes an attractive attachment for a chandelier or a table.

Having described my invention, what I claim as new, and desire to secure by Letters Patent, is—

1. The thermometer herein described, consisting of a central tube with a series of three or more radial scales attached to a suitable support, as set forth.

2. The combination, with a central tube and a series of radial scales, of a top and base, the base provided with holes forming air-passages leading to the bulb, as set forth.

In witness whereof I have hereunto signed my name in the presence of two subscribing witnesses.

G. ELBERT TAYLOR.

Witnesses:
R. F. OSGOOD,
P. A. COSTICH.